US005625192A

United States Patent [19]

Oda et al.

[11] Patent Number: 5,625,192

[45] Date of Patent: Apr. 29, 1997

[54] IMAGING METHODS AND IMAGING DEVICES

[75] Inventors: Minoru Oda, Tokyo; Kazuo Makishima, Saitama; Yoshiaki Ogawara, Tokyo; Masaru Matsutaka, Saitama; Shigenori Miyamoto, Hyogo, all of Japan

[73] Assignee: The Institute of Physical and Chemical Research

[21] Appl. No.: 518,140

[22] Filed: Aug. 22, 1995

[30] Foreign Application Priority Data

Aug. 23, 1994 [JP] Japan .................................... 6-198699

[51] Int. Cl.$^6$ ...................................................... G01K 7/00

[52] U.S. Cl. ......................................... 250/363.1; 378/149

[58] Field of Search ......................... 250/363.1; 378/149, 378/148, 154

[56] References Cited

U.S. PATENT DOCUMENTS 5,432,349 7/1995 Wood et al. ........................ 250/336.01

OTHER PUBLICATIONS

K.S. Wood et al., Review of Scientific Instruments, vol. 63, No. 10, Oct. 1992 "A Fourier Transform Microscope for X-ray Imaging".

Journal of Optical Society of America An Optics and Image Science, vol. 3, No. 12, Dec. 1986, "Rotational Aperture Synthesis for X-ray", by L.N. Mertz pp. 2167–2170.

Crannell C.J. et al, "A Fourier Transform Telescope for Sub-Arcsecond Imaging of X-rays and Gamma Rays & Large Optics Technology", 19–21 Aug. 1995, vol. 571, Proceedings of SPIE-The International Society for Optical Engineering, pp. 142–148.

Fischer, T.R. et al "Imaging of Gamma Rays with the WINKLER High-Resolution Germanium Spectrometer & IEEE Transactions On Nuclear Science", vol.37, No. 3, pp. 1443–1489.

Applied Optics, vol. 20, No. 20 Oct. 15, 1981, "Optical Alignment of an X-ray Collimator", by Hoekstra, pp. 3630–3634.

Kosugi et al, "The Hard X-ray telescope for the Solar-A Mission & Solar Physics", vol. 136, No. 1, pp.17–36.

Space Science Reviews 8 (1968) pp. 471–506 "The Modulation Collimator in X-ray Astronomy".

Space Science Reviews 8 (1968) pp. 507–553 "Optical Identification and Interpretation of X-ray Sources".

Space Science Reviews 8 (1968) pp. 534–542 "Predicted Performance of a Rotating Modulation Collimator for Locating Celestial X-ray Sources".

J. F. Linsly and S Serio (eds.), Physics of Solar and Stellar Coronae, pp. 59–68.

Physics of Nuetron Stars and Black Holes, pp. 554–558. Background and History of the "Bamboo Screen Collimator".

Applied Optics, vol. 4, No. 1, pp. 143. (Jan. 1965 ).

Surikagaku (mathematical science) No. 359, pp. 43–47, 1993, with *Abstract*, "The Cosmos Observed Through a Screen, Short History of Astronomy".

Proc. Japan Acad., 71, Ser. b (1995) 1–4.

Surikagaku (mathematical science) No. 378, pp. 24–27, 1994, with *ABSTRACT*, "From Investigation into the Cosmos to Investigation in the Brain".

*Primary Examiner*—David P. Porta
*Assistant Examiner*—Richard Hanig
*Attorney, Agent, or Firm*—Armstrong, Westerman, Hattori, McLeland, & Naughton

[57] ABSTRACT

An imaging method and an imaging device are disclosed which use no image forming optical system. A grid system 25 including an objective grid array 22 with a plurality of coplanarly arranged grids having pitches different from each other and a detector grid array 23 having a similarly enlarged configuration of the objective grid array, and a detector array 24 constitute a detection system. An energy ray such as an X-ray which has been transmitted through the grid system 25 is detected by the detector array 24 while rotating an object 20 under observation placed on a rotary table 21. A signal processing means 28 subjects signals detected by the detector array 24 to inverse Fourier transform to synthesize an image of the object 20, and the image is displayed on a display 29.

12 Claims, 9 Drawing Sheets

IMAGING METHODS AND IMAGING DEVICES

BACKGROUND OF THE INVENTION

1. Field of the Invention

The present invention relates to an imaging method and an imaging device which use no image forming system.

2. Description of Prior Art

In image formings with light rays including an infrared ray, a visible ray and a ultraviolet ray, an image forming optical system is utilized. Further, with respect to a soft X-ray having an energy of 3 keV or lower, a catoptric image forming system can be constructed utilizing such properties that it is totally reflected when caused to obliquely impinge upon a polished metal surface. Accordingly, it is possible to make an image by utilizing the catoptric image forming system.

However, the above-mentioned catoptric image forming system for a soft X-ray has many restrictions because it utilizes oblique incidence at an extremely slant angle. Further, with respect to a hard X-ray or gamma ray which has a higher energy, it is hardly possible to construct an effective image forming system. Accordingly,. it cannot be expected to make an image by means of an image forming system.

As a method for making an image with respect to an energy ray for which an image forming optical system cannot be constructed, there may be mentioned one which comprises observing an object through a bundle of elongate metal pipes. That is, as shown in FIG. 11, a number of elongate metal pipes 11 are bound into a bundle, and a detector 12 is disposed at the rear end of each of the pipes. Output signal of the each of the detector 12 is processed by a signal processing means 13 into pixel data and displayed on a display means 14 such as CRT, and consequently, an image 15 of a radiation source 10 is displayed.

However, in the method using a bundle of elongate metal pipes, resolution cannot be considerably enhanced because of limitation in diminishing the inner diameter of the metal pipe. Further, if the inner diameter of the metal pipe is diminished, quantity of radiation which reaches the detector is decreased, thereby leading to inferior sensitivity. Moreover, structure of the object cannot be resolved in the depth direction so that a structure image superimposed in the depth direction is observed. Accordingly, the method is not suitable for observation of a radiation source having a three-dimensional structure.

SUMMARY OF THE INVENTION

It is an object of the present invention to provide an imaging method and an imaging device which use no image forming system. In particular, it is an object of the present invention to provide a means which is capable of detecting a spatial distribution of an energy ray source, such as an X-ray source or gamma ray source, having a spatial structure with high resolving power and displaying an image of the energy ray source.

According to one aspect of this invention, there is provided an imaging method comprising:

providing a grid system including an objective grid array with a plurality of coplanarly arranged grids having pitches different from each other, and a detector grid array having a similarly enlarged configuration of the objective grid array and spaced a predetermined distance apart from the objective grid array, placing an object to be observed in the vicinity of the focal point of the grid system, on which lines connecting corresponding grids in the detector grid array and the objective grid array converge, individually detecting energy rays each of which has been emitted from the object and transmitted through the corresponding two grids in the grid system while relatively rotating the object and the grid system about the center axis of the grid system which passes through the focal point and orthogonally intersects the plane of the grid array, and subjecting the detected signals to an operation using inverse Fourier transform or linear orthogonal integral transform similar thereto, or maximum entropy method, to synthesize an image of the object.

According to another aspect of this invention, there is provided an imaging method comprising:

providing a grid system including an objective grid array with a plurality of coplanarly arranged grid couples, and a detector grid array having a similarly enlarged configuration of the objective grid array and spaced a predetermined distance apart from the objective grid array; the coupled grids having the same slit direction and the same pitch but having phases shifted from each other by $\pi/4$, the grid couples having a plurality of intermittent slit directions and having different pitches in each of the slit directions, placing an object to be observed in the vicinity of the focal point of the grid system, on which lines connecting corresponding grids in the detector grid array and the objective grid array converge, individually detecting energy rays each of which has been emitted from the object and transmitted through the corresponding two grids in the grid system, and subjecting each set of the detected signals corresponding to the coupled grids having the same slit direction and the same pitch but having phases shifted from each other by $\pi/4$ as cosine and sine components in Fourier transform to an operation using linear orthogonal integral transform or a non-linear optimization method to synthesize an image of the object.

It is possible to observe change with time of the object in real time by effecting the detection at predetermined time intervals to obtain signals, and sequentially displaying images each of which is synthesized from the detected signals at each signal acquisition.

When the relative position between the focal point of the grid system and the object is changed to form a plurality of images, it is possible, based thereon, to synthesize a three-dimensional image of the object.

The imaging methods are applicable to any kind of energy rays and, in particular, suitable for an X-ray or gamma ray which has no other effective imaging method.

According to another aspect of this invention, there is provided an imaging device comprising:

a grid system including an objective grid array with a plurality of coplanarly arranged grids having pitches different from each other, and a detector grid array having a similarly enlarged configuration of the objective grid array and spaced a predetermined distance apart from the objective grid array, a detector array including a plurality of detectors each detecting energy ray transmitted through each of the grids of the detector grid array, a placement means on which an object is placed, a means for relatively rotating the grid system and the placement means about the axis passing through the point on which lines connecting corresponding grids in the detector grid array and the objective grid array converge and orthogonally intersecting the plane of the grid array, a signal processing means to which detected signals from the detector array are inputted, and an image display means for displaying an image of the object based on the signals from the signal processing means.

The signal processing means subjects each set of the detected signals obtained from the detector array at a plurality of rotation angles to operation by two-dimensional inverse Fourier transform or non-linear optimization method represented by maximum entropy method to synthesize an image of the object.

According to another aspect of this invention, there is provided an imaging device comprising: a grid system including an objective grid array with a plurality of coplanarly arranged grid couples, and a detector grid array having a similarly enlarged configuration of the objective grid array and spaced a predetermined distance apart from the objective grid array; the coupled grids having the same slit direction and the same pitch but having phases shifted from each other by $\pi/4$, the grid couples having a plurality of intermittent slit directions and having different pitches in each of the slit directions, a detector array including a plurality of detectors each detecting energy ray transmitted through each of the grids of the detector grid array, a signal processing means to which detected signals from the detector array are inputted, and an image display means for displaying an image of the object based on the signals from the signal processing means.

In this case, the signal processing means subjects each set of the detected signals corresponding to the coupled grids having the same slit direction and the same pitch but having phases shifted from each other by $\pi/4$ as cosine and sine components in Fourier transform to two-dimensional inverse Fourier transform to synthesize an image of the object.

The signal processing may be performed by non-linear optimization method represented by maximum entropy method as well as two-dimensional inverse Fourier transform.

Each of the objective-detective grid pairs in the grid system extracts a Fourier component of a spatial structure of an object under observation according to the grid pitch. To synthesize a two-dimensional image of the object, it is required that many Fourier components are detected in a plurality of direction in the two-dimensional plane. Fourier components in different directions are obtained by performing observation while rotating the object relative to the fixed grid system or while rotating the grid system relative to the stationary object.

When the grid system comprises grid pairs having different pitches with respect to each of the plurality of the slit direction, Fourier components in the plurality of the direction can be obtained in parallel with neither the grid system nor the object being rotated.

The grid system comprises the objective grid array and the detector grid array having a similarly enlarged configuration thereof and thus has its focal point at the point on which lines connecting corresponding grids in the detector grid array and the objective grid array converge. Accordingly, if the magnification of similar enlargement in the grid system is denoted by m, the number of grids N, and the distance from the objective grid array to the focal point a, the grid system has a focal depth approximately represented by the following formula:

$$ma/3(m-1)N.$$

Therefore, it is possible to clearly synthesize an image of a spatial structure of an object in the thickness range of approximately the above-mentioned focal depth around the focal point of the grid system.

DESCRIPTION OF THE PREFERRED EMBODIMENTS

Now, the present invention will be described in detail with reference to embodiments which synthesize an image of an X-ray-emitting object and display the image. However, it is to be noted that the reference is made only for the convenience of explanation and it is by no means intended thereby that energy rays used in the present invention are restricted to X-rays.

(First Embodiment)

Figure 1:
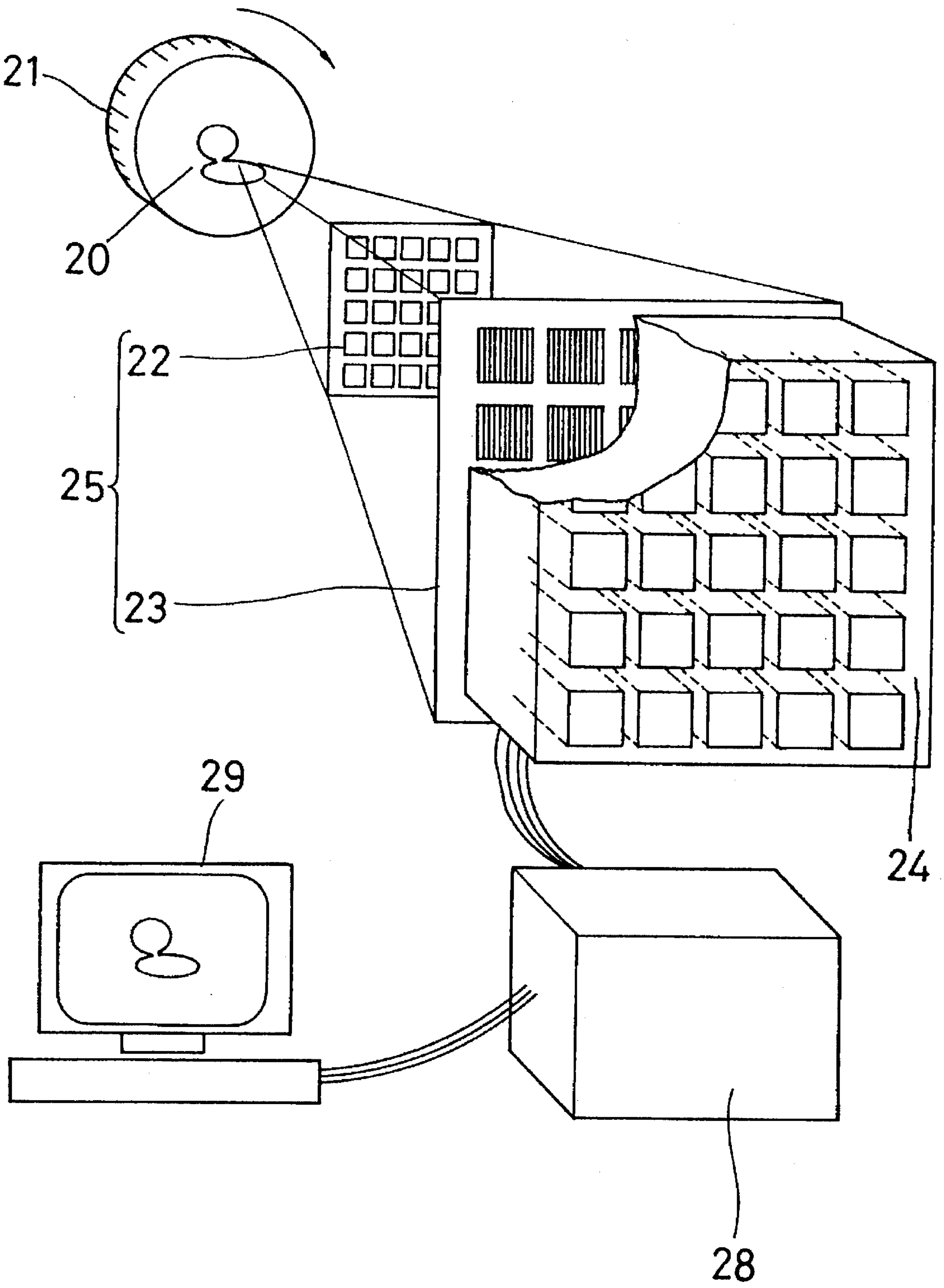
FIG. 1 is an illustrative view of the first embodiment of the imaging device according to the present invention.

FIG. 1 is a schematic view showing a system structure of one embodiment of the present invention.

An object 20 to be observed which is an X-ray-emitting object is placed on a rotary table 21 and thereby rotated at a constant speed. The object to be observed may be, for example, an object emitting fluorescent X-ray due to having been irradiated with an X-ray.

An image forming device comprises a grid system 25 including an objective grid array 22 and a detector grid array 23 spaced a predetermined distance from each other, an X-ray detector array 24 located behind the detector grid array 23, a signal processing system 28 for processing signals form the X-ray detector array 24 to synthesize an image, and a display 29.

Figure 2A:
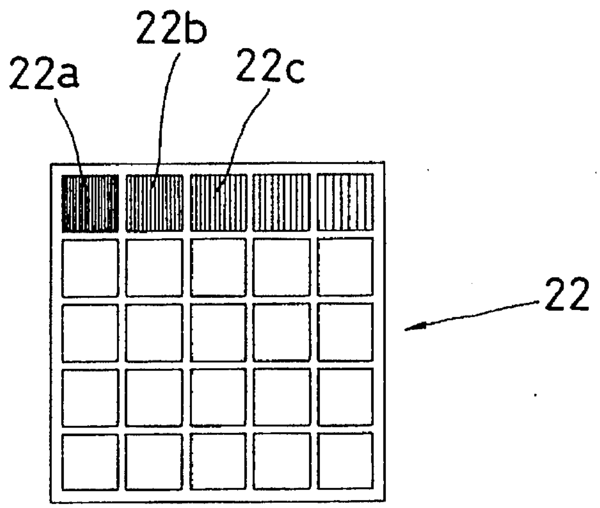
FIG. 2A is a schematic view of an objective grid array.
Figure 2B:
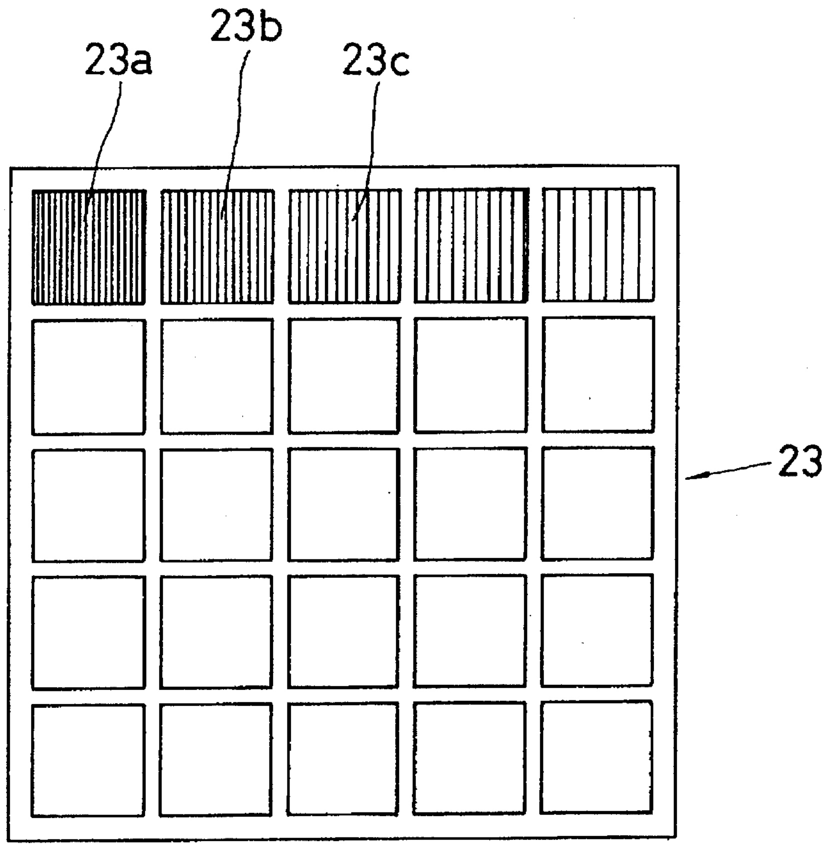
FIG. 2B is a schematic view of a detector grid array of the first embodiment.

The objective grid array 22 of the grid system 25 comprises, as shown in FIG. 2A, N (5×5=25 in the illustrated embodiment) objective grids 22*a*, 22*b*, 22*c*, . . . in array. As shown in FIG. 2B, the detector grid array 23 comprises N (5×5=25 in this embodiment) detector grids 23*a*, 23*b*, 23*c*, . . . in array correspondingly to the respective grids of the objective grid array 22. The X-ray detector array 24 comprises N (5×5=25 in the illustrated embodiment) X-ray detectors 24*a*, 24*b*, 24*c*, . . . which detect X-rays that have passed through the detector grids 23*a*, 23*b*, 23*c*, . . . , respectively. The grids are arranged in such a manner that all of them are the same in slit direction.

The grid arrays 22, 23 are prepared by forming fine slits in an X-ray-opaque metal material, for example, a tungsten plate of 0.5 mm in thickness through a photo-etching method or the like. The metal material is required to be of a larger thickness as energy level of an X-ray to be observed becomes higher.

The N objective grids 22*a*, 22*b*, 22*c*, . . . have grid pitches different from each other. If the grid pitch of the k-th objective grid is represented by $p_k$, the $p_k$ is set, for example, as defined by the following formula (1) wherein Δ is a quantity referred to as basic pitch and set to be approximately the same as the size of an object to be observed.

$$p_k = \Delta/k\ k = 1, 2, \ldots, N \quad (1)$$

By setting the grid pitches as described above, the object to be observed may be divided into approximately N×N pixels.

Figure 3A:
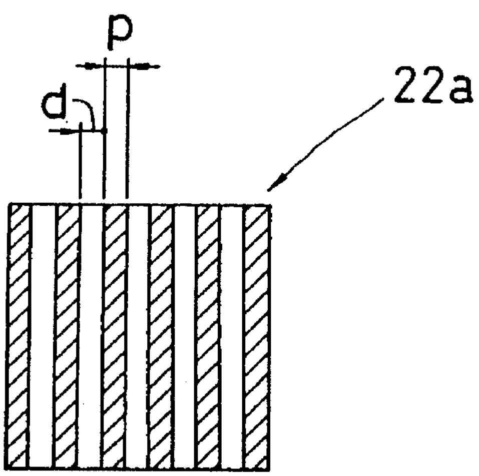
FIG. 3A is a schematic view of an objective grid.
Figure 3B:
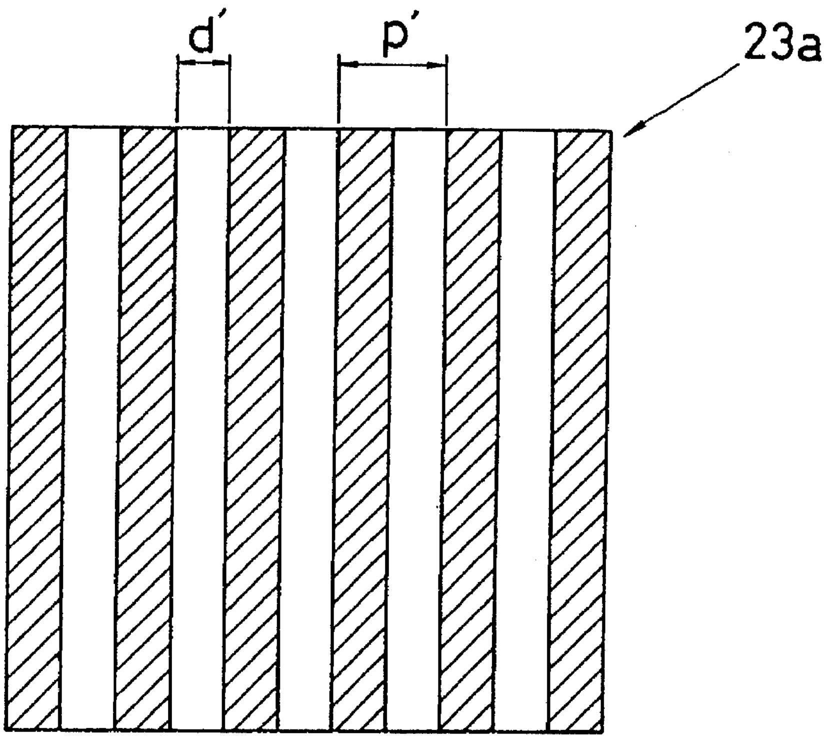
FIG. 3B is a schematic view of a detector grid.

The detector grids 23*a*, 23*b*, 23*c*, . . . have similarly enlarged configurations of the corresponding objective grids 22*a*, 22*b*, 22*c*, . . . , respectively. For example, as shown in FIG. 3, each of the grids of the arrays is formed in a square area and set to satisfy such a relationship that if the objective grid 22*a* has a slit width of d and a grid pitch of p and the detector grid 23*a* corresponding thereto has a slit width of d' and a pitch of p', d/p=d'/p'. It is preferred that d=p/2, d'=p'/2. The magnification of similar enlargement between the two kinds of the grids, m=p'/p, is practically set to be about 3 to 10 taking into consideration required resolution and focal depth, fineness of preparable grids, size of an X-ray detector which can be employed, and the like. However, the magnification is not necessarily restricted to the range of 3 to 10.

Figure 4:
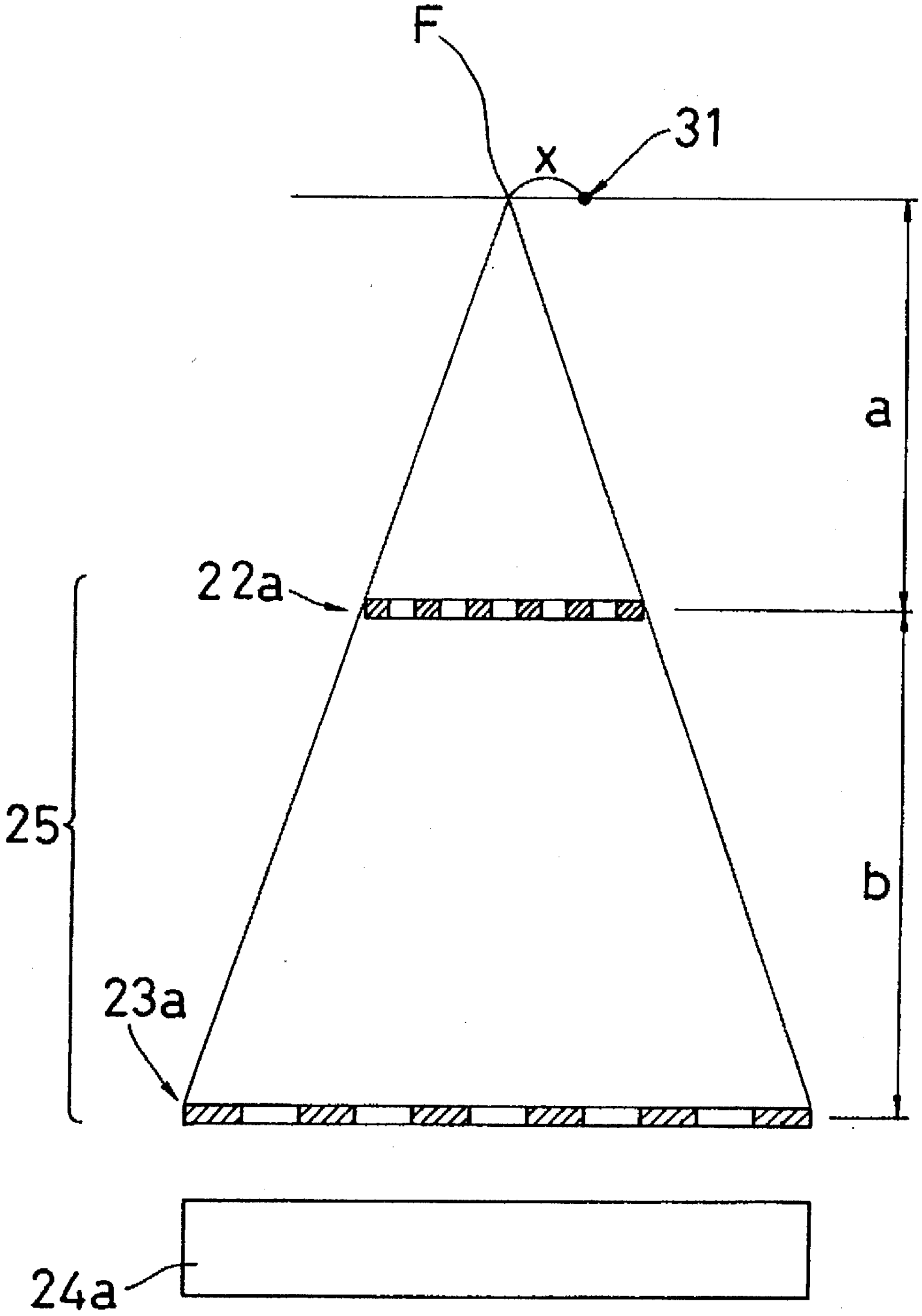
FIG. 4 is an arrangement view of the objective grid array and the detector grid array.
Figure 6:
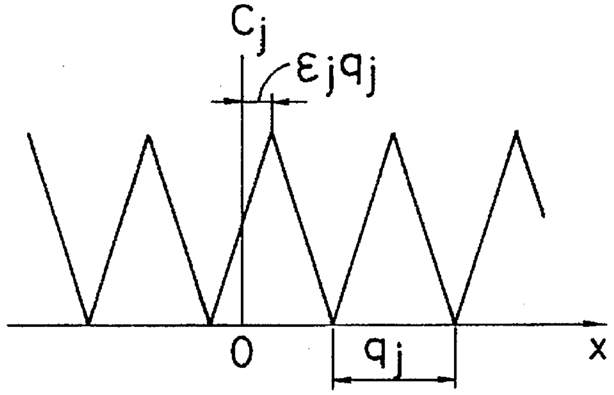
FIG. 6 is an explanatory view of angular response characteristics of an individual detector unit.

As shown in FIG. 4, if the distance between the objective grid array 22 and the detector grid array 23 which are spaced is b, lines connecting corresponding slits in the grids converge upon the point F frontally a=b/(m−1) distant from the objective grid array 22 and on the line connecting the centers of the two grids 22*a* and 23*a*. The point F is referred to as the focal point of the grid system 25. The objective grid 22*a* and the detector grid 23*a* which make a pair and the detector 24*a* located in the rearward thereof constitute an individual detection unit. If a point-like X-ray source 31 is located in the focal plane at a position apart from the foot of the center axis at a distance of x in the direction perpendicular to the slits, the count $C_j$ of the individual detection unit shows a periodical response as shown in FIG. 6. An individual detection unit having a smaller grid pitch $p_j$ shows a shorter period of the response to the distance x. Specifically, the response period is represented by the following formula (2).

$$q_j\{m/(m-1)\}\times p_j \quad (2)$$

The resolution δ is approximately represented by the following formula (3) with the minimum pitch $p_N$ of the objective grid and the magnification m of the similar enlargement of the grid system.

$$\delta=(p_N/2)\times(m/m-1)=(\Delta/2N)\times(m/m-1) \quad (3)$$

For example, if the minimum pitch is about 0.1 mm, it is possible to attain resolution approximate to 0.05 mm. In this connection, if the magnification of the similar enlargement of the grid system m is excessively small (for example, m<3), the factor (m/m−1) in the formula is disadvantageously large in terms of resolution.

The focal depth of the imaging system is approximately represented by the formula (4) with the magnification m of the similar enlargement of the grid system, number N of the grids, and the distance a from the grid array 22 to the focal point F.

$$ma/3(m-1)N \quad (4)$$

Accordingly, for example, if a=3 cm, m=5, and N=25, the focal depth is approximately 0.5 mm.

Figure 5:
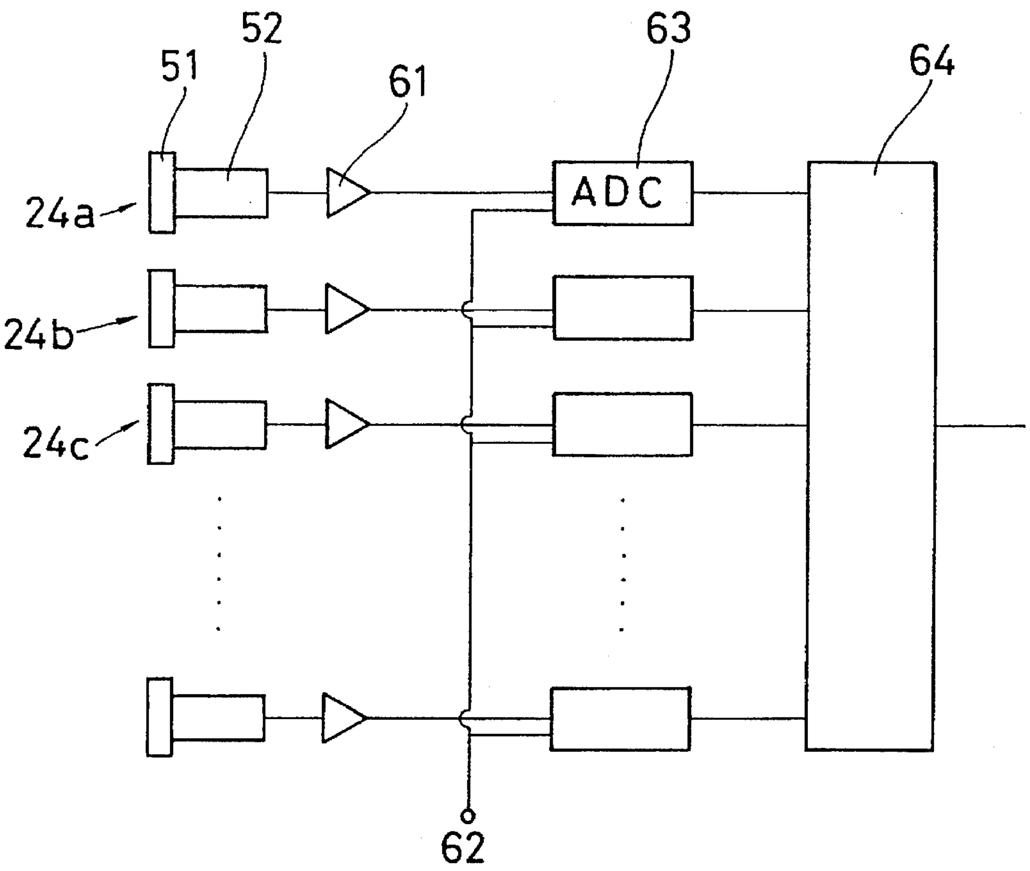
FIG. 5 is a block diagram of a signal processing circuit.

In FIG. 5, a block diagram of a signal processing circuit 28 is shown. For example, detection signals from the X-ray detector 24*a* comprising a scintillation crystal 51 made of NaI(T1) and a photomultiplier tube 52 are amplified by an operational amplifier 61. The amplified signals are converted at every event into digital data by means of an A/D converter 63, and the digital values are converted into incident X-ray energy according to a certain relationship between them. After only X-ray events in an intended energy range are selected, number of the events are counted by, for example, accumulating the events every 10° rotation of the rotary table 21. The A/D converter 63 is controlled by gate signals 62 generated synchronously with the rotations of the rotary table 21.

Of the signals from the detector, only those of which X-ray energy is within a specific range are counted to determine the count $C_j(\theta_i)$ of the j-th detector wherein $\theta_i$ is a rotation angle of the rotary table. Thus, a two-dimensional set (5) of the detected values is obtained.

$$\{C_1(\theta_1), C_1(\theta_2), C_1(\theta_3), \ldots, \quad (5)$$
$$C_2(\theta_1), C_2(\theta_2), C_2(\theta_3), \ldots,$$
$$\ldots\ldots\ldots\ldots\ldots$$
$$C_N(\theta_1), C_N(\theta_2), C_N(\theta_3), \ldots\}$$

Figure 7A:
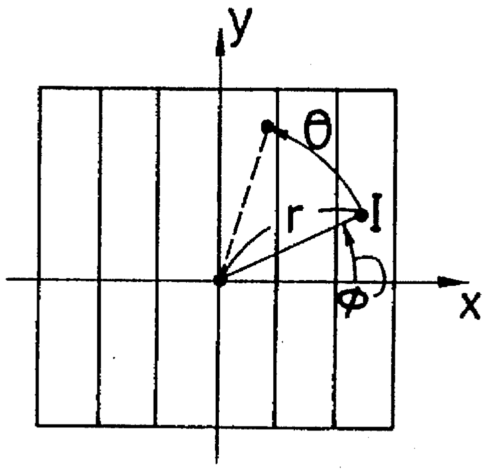
FIG. 7A is an explanatory view of a coordinate system.

The center axis of the grid system 25, i.e., the axis passing through the focal point F of the grid system 25 and perpendicular to the plane of the objective grid array is aligned with the rotation axis of the rotary table 21. It is supposed that a X-ray point source having an intensity I is located on the focal plane at a distance of r from the rotation axis and at an azimuth angle of ϕ relative to the rotation axis (FIG. 7A). If the rotary table 21 is rotated by θ, the azimuth angle of the X-ray source is then (θ+ϕ). Therefore, the distance x measured in the direction perpendicular to the slits is expressed as:

$$x=r\cos(\theta+\phi).$$

Figure 7B:
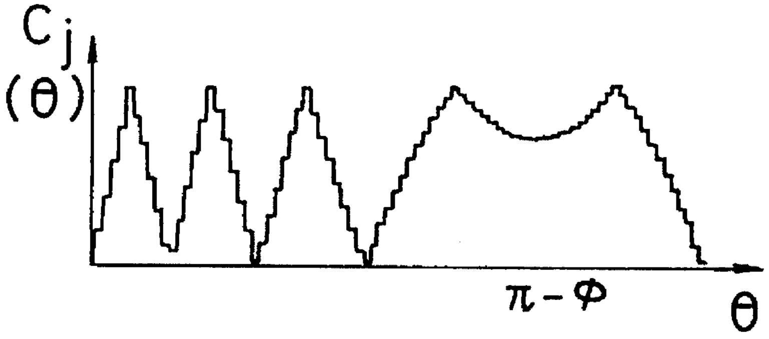
FIG. 7B is a signal pattern detected by the individual detector unit.

This is applied to FIG. 6 to approximate the triangular pattern in FIG. 6 as a sine wave. Then, the count of the j-th individual detector unit is represented by:

$$C_j(\theta) = (I/2\{1+\cos[2\pi(x/q_j-\epsilon_j)]\} \quad (6)$$
$$= (I/2)\{1+\cos[2\pi(r\cos(\theta+\phi)/q_j-\epsilon_j)]\}$$

wherein $\epsilon_j(0<\epsilon_j<1)$ is a distance (measured in terms of $q_j$ as a unit) between the maximum transmission direction and the center axis of the grids which is as defined in FIG. 6 and which is referred to as grid offset. If $\epsilon_j$=0, the grid is called as a cosine type, and If $\epsilon_j$=¼, a sine type. In regard to the rotary table, $\epsilon=1/8$ is optimum. $C_j(\theta)$ represented by the above formula (6) is none other than Fourier component of the azimuth angle θ concerning X-ray spatial distribution and the wavenumber $2\pi/q_j$. FIG. 7B exhibits the signal response of an individual grid unit while a point source I moves in the field of view as indicated in FIG. 7A.

In general, even if an X-ray source has an extended complex spatial distribution, $C_j(\theta)$ also represents spatial Fourier component of the X-ray source because of Fourier transform being linear. Accordingly, it is possible to synthesize a two-dimensional image of the X-ray source structure of an object under observation by subjecting the two-dimensional set of counts of $\{C_j(\theta_i)\}$ to inverse Fourier transform.

It is to be noted that the two-dimensional set of counts $\{C_j(\theta_i)\}$ does not necessarily carry image information with fidelity. For example, if observation time is short, the count $C_j(\theta_i)$ is inevitably accompanied by a Poisson error $\pm[C_j(\theta_i)]^{1/2}$ to cause noise. Further, observation data can not necessarily be obtained with respect to all of {i,j}. In such cases, inverse transform method is not employed which derives an original image from observed data, but image synthesis is effected in the following manner. In contrast to the inverse transform method, various reconstructed images are supposed and it is simulated what data $\{C'_j(\theta_i)\}$ are obtained by observing the reconstructed images with the device. Then, the actually observed data $\{C_j(\theta_i)\}$ and the simulated data $\{C'_j(\theta_i)\}$ are compared with respect to all of {i,j}. Of the results, a case is adopted as the correct solution, where $C'_j(\theta_i)\approx C_j(\theta_i)$ with a difference within the Poisson error and the reconstructed image has the simplest contour under certain conditions. Since an amount called entropy is used as a measure of the contour simplicity, this method is often referred to as the maximum entropy method. More generally, image synthesis can be effected in a non-linear optimization method.

Image synthesis from the data detected through each of the grid pairs is effected in an arithmetic circuit 64, and the resulting image is displayed on a display 29. As described above, since the digital values converted by the A/D converter 63 can be converted into incident X-ray energy, it is possible to form an image derived only from X-ray having specific energy by synthesizing an image only from detected data having digital values in a specific range. If the detected X-ray is fluorescent X-ray emitted from an object under observation, a spatial distribution image of specific components can be formed because of energy of the fluorescent X-ray being specific to a component.

Areas of the grids in the array are related to brightness of an image. Larger grid areas provide a brighter image. The number of the grids in the array is related to fineness of an image. A larger number N of grids, i.e., a larger variety of grid pitches $p_k$ enables a more accurate image to be synthesized.

Use of pairs of objective and detector grids having different positions of focal points F, i.e., grid pairs having different magnifications ms of similar enlargements enables images at various depths in an object under observation to be formed in parallel. Further, the position of the focal point F can be changed by changing the distance b between the objective grid array and the detector grid array.

If an object under observation is rotated by 180°, information necessary for synthesizing one image is obtained. When an object under observation changes with time, image synthesis is carried out at predetermined time intervals and the resulting images are sequentially displayed on the display, thereby enabling the change with time of the object to be observed in real time.

In FIG. 1, the grid system 25 is fixed and the object under observation is rotated. To the contrary, however, an object under observation and the grid system 25 may be fixed and rotated about the center axis, respectively, to obtain the same data and in turn to synthesize an image of the object under observation.

According to this embodiment, although the grid system or an object under observation is required to be rotated, a simplified system structure is advantageously realized owing to only a small number of the individual detector units being required.

(Second Embodiment)

In the next place, a method will be described which is capable of obtaining data and synthesizing an image with neither an object under observation nor a grid system being rotated.

The structure of the device in this embodiment is the same as in the first embodiment except for the grid system.

Figure 8A:
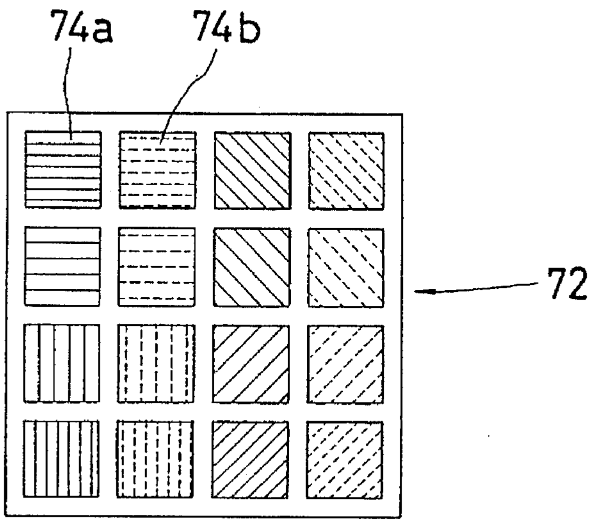
FIG. 8A is a schematic view of an objective grid array.
Figure 8B:
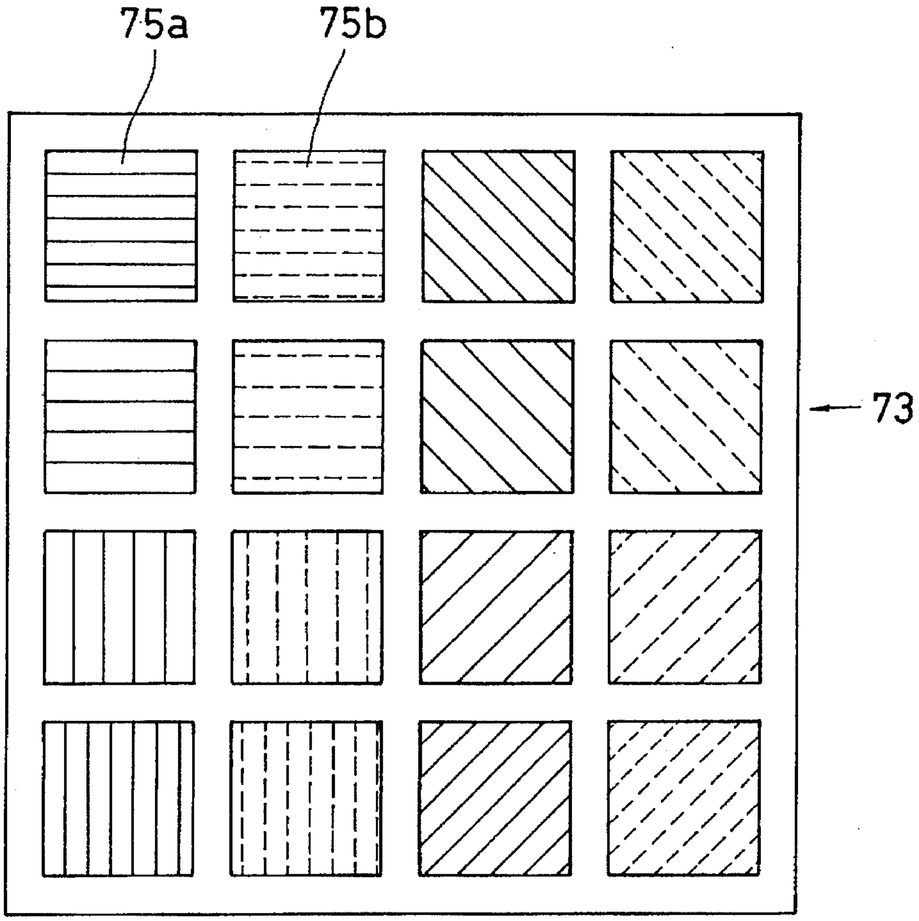
FIG. 8B is a schematic view of a detector grid array of the second embodiment.

In this embodiment, grid pairs having different slit directions are used as shown in FIG. 8 to extract spatial Fourier components in the directions, and the components are inversely transformed to obtain a two-dimensional image. As in the above-described embodiment, a detector grid array 73 has a similarly enlarged configuration of an objective grid array 72. In FIG. 8, an example is shown, for simplicity, in which four directions 0°, 45°, 90° and 135° are set as the slit directions and two grid pitches are set for each of the directions. In order to synthesize an accurate image, however, about 10 slit directions and about 20 grid pitches for each of the directions are required.

With respect to grids, in the same manner as in a grid 74*a* shown by a solid line and a grid 74*b* shown by a dashed line, those having the same slit direction and the same grid pitch but having pitch phases shifted by ¼ pitch from each other are formed as a couple. The grid pitch $p_k$ is generally set to be expressed as the following formula, and the grid pitch and the slit width are preferably determined in such a relationship that the former is two times as large as the later.

$$p_k=\Delta/k\ k=1, 2, \ldots, N$$

Figure 9:
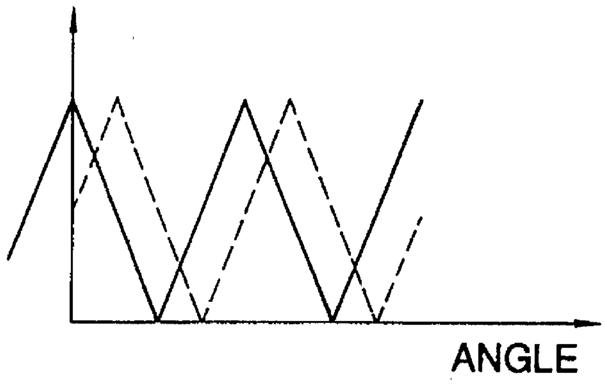
FIG. 9 is an explanatory view of angular response characteristics of a grid pair of the second embodiment.

The relationship between the transmission function of the grid pair 74*a*, 75*a* shown by a solid line and that of the grid pair 74*b*, 75*b* shown by a dashed line which is phase-shifted by ¼ pitch from the grid pair 74*a*, 75*a* corresponds to the relationship between cosine and sine functions in trigonometry, as shown in FIG. 9 by solid and dashed lines. These correspond to the cases of the above-mentioned formula (6) wherein $\epsilon_j$ is 0 and $\epsilon_j$ is ¼, respectively. If the grid system has M slit directions and N grid pitches, each of the objective grid array 72 and the detector grid array 73 comprises (M×N×2) grids, and correspondingly thereto, the detector array comprises (M×N×2) detectors. Since count values obtained by the N×2 detectors for one direction correspond to a specific azimuth angle and a specific wavenumber, the sets of the detected values correspond to N sets of complex Fourier components.

Therefore, if sets of counts $\{C_{ij}, S_{ij}\}$ are obtained wherein $C_{ij}$ is a count of the detector corresponding to the grid having the i-th slit direction and the j-th pitch and $S_{ij}$ is a count of the detector corresponding to the grid phase-shifted by ¼ pitch from the former grid, it is possible to synthesize an image by inverse Fourier transform or maximum entropy method in the same manner as in the first embodiment.

When an object under observation changes with time, data acquisition and image synthesis are carried out at predetermined time intervals and the resulting images are sequentially displayed on the display, thereby enabling the change with time of the object to be observed in real time.

According to this embodiment, it is not required to rotate the object under observation or the grid system. This enables rapid data acquisition and image synthesis to be realized. Accordingly, if an object to be observed is irradiated with X-ray to detect fluorescent X-ray, X-ray exposure dose to the object to be observed may be reduced.

(Third Embodiment)

Figure 10:
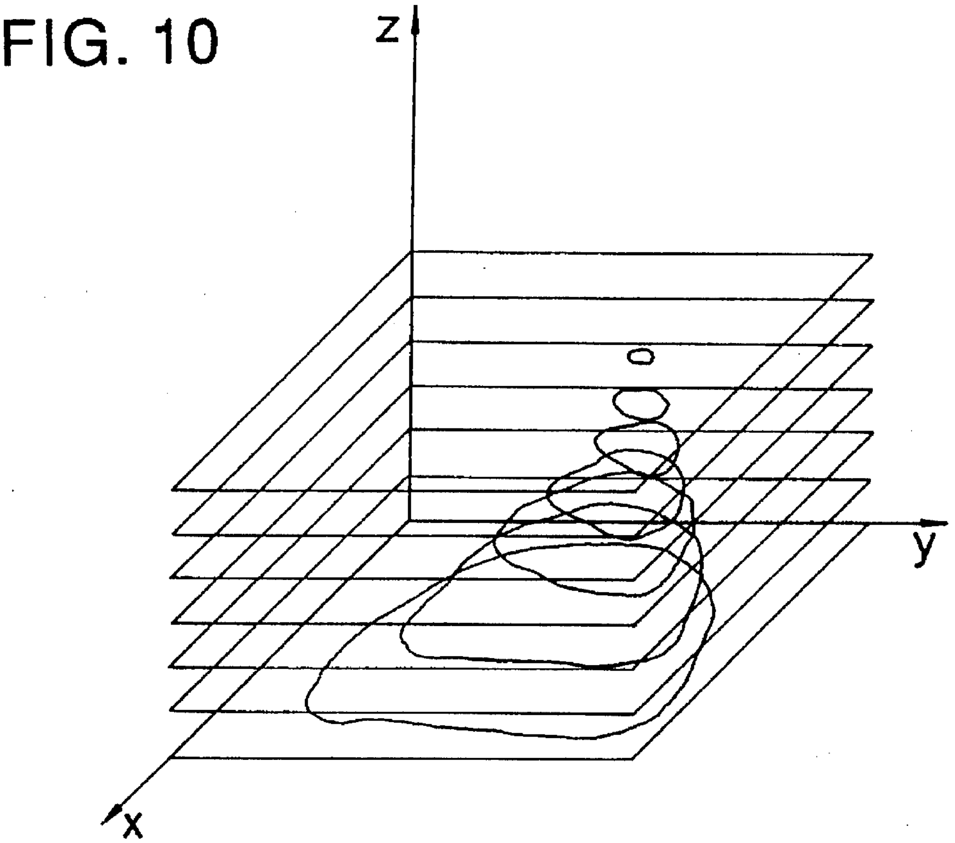
FIG. 10 is an illustrative view of an example of three-dimensional display.
Figure 11:
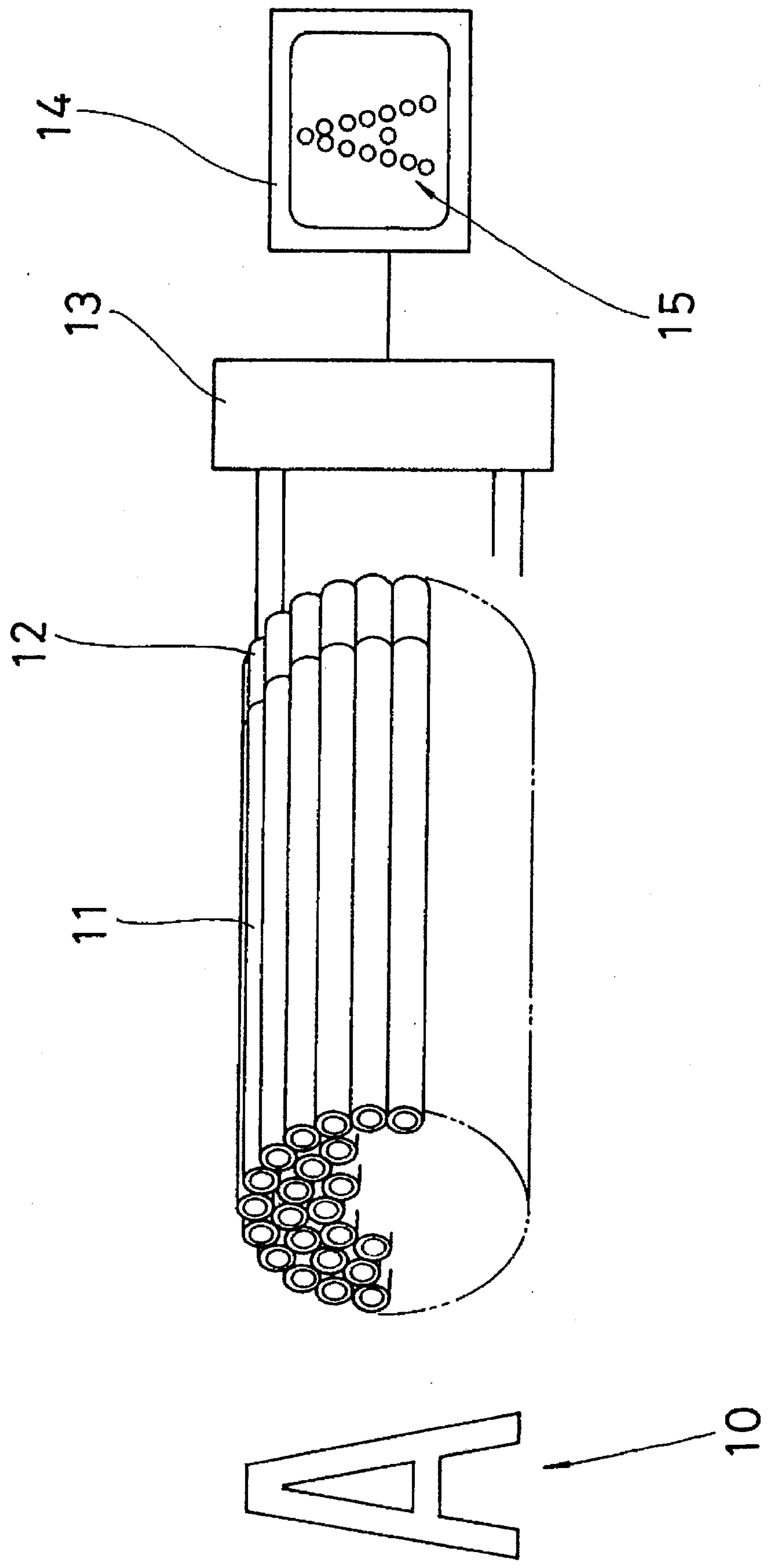
FIG. 11 is an illustrative view of an image observing method using a bundle of metal pipes.

In the first and second embodiments, a two-dimensional image of an object under observation viewed in a fixed direction is synthesized. When X-ray is detected with different positions of the focal point by changing the distance b between the objective grid and the detector grid, two-dimensional images in different focal planes, i.e., tomographic images can be obtained. The thus obtained plural tomographic images are displayed on a display in conformity with three-dimensional coordinates, thereby enabling three-dimensional display to be realized as shown in FIG. 10. In this case, when each of the image forming intervals between the tomographic images is set to be substantially the same as or shorter than the focal depth represented by the formula (4), virtually consecutive two-dimensional images are obtained and consequently a natural three-dimensional image is advantageously attained.

Further, it is also possible to obtain three-dimensional distribution data by modifying the first embodiment in such a manner that the rotary table is provided with a second rotation axis or the grid system 25 is movably disposed to obtain two-dimensional images of an object under observation from a plurality of directions, and subjecting the images to operation in a tomographic method. Likewise, it is possible to obtain three-dimensional distribution data by rotating the grid system in the second embodiment to obtain two-dimensional images of an object under observation from various directions, followed by extraction of three-dimensional distribution data therefrom. The three-dimensional distribution data can be processed into a desired form such as a three-dimensional projection chart, a radiation source distribution in an arbitrary plane or the like and displayed on a display.

In the above, image detection and image synthesis are described with respect to X-ray. However, the method of the present invention is not restricted to X-ray and is applicable to image detection and image synthesis using another energy ray, for example, a gamma ray or a light ray.

According to the present invention, it is possible without using an image forming optical system to detect an image with high resolving power and to synthesize a reconstructed image. In particular, it is possible to detect an image of an X-ray- or gamma ray-emitting source which has heretofore been difficult to form an image and to display a reconstructed image.

What is claimed is:

1. An imaging method comprising:

providing a grid system including an objective grid array with a plurality of coplanarly arranged grid couples, and a detector grid array having a similarly enlarged configuration of the objective grid array and spaced a predetermined distance apart from the objective grid array; the coupled grids having the same slit direction and the same pitch but having phases shifted from each other by $\pi/4$, the grid couples having a plurality of intermittent slit directions and having different pitches in each of the slit directions, placing an object to be observed in the vicinity of the focal point of the grid system, on which lines connecting corresponding grids in the detector grid array and the objective grid array converge, individually detecting energy rays each of which has been emitted from the object and transmitted through the corresponding two grids in the grid system, and subjecting each set of the detected signals corresponding to the coupled grids having the same slit direction and the same pitch but having phases shifted from each other by $\pi/4$ as cosine and sine components in Fourier transform to an operation using linear orthogonal integral transform or a non-linear optimization method to synthesize an image of the object.

2. The imaging method according to claim 1, wherein the operation is two-dimensional inverse Fourier transform, linear orthogonal integral transform, or maximum entropy method.

3. The imaging method according to claim 1, wherein the detection is effected at predetermined time intervals to obtain signals, and images are sequentially displayed each of which is synthesized from the detected signals at each signal acquisition.

4. The imaging method according to claim 1, wherein the relative position between the focal point of the grid system and the object is changed to form a plurality of images, and based thereon, a three-dimensional image of the object is synthesized.

5. The imaging method according to claim 1 wherein the energy ray is an X-ray or gamma ray within a predetermined energy range.

6. An imaging device comprising:

a grid system including an objective grid array with a plurality of coplanarly arranged grids having pitches different from each other, and a detector grid array having a similarly enlarged configuration of the objective grid array and spaced a predetermined distance apart from the objective grid array, a detector array including a plurality of detectors each detecting energy ray transmitted through each of the grids of the detector grid array, a placement means on which an object is placed, a means for relatively rotating the grid system and the placement means about the axis passing through the point on which lines connecting corresponding grids in the detector grid array and the objective grid array converge and orthogonally intersecting the plane of the grid array, a signal processing means to which detected signals from the detector array are inputted, and an image display means for displaying an image of the object based on the signals from the signal processing means;

said signal processing means subjecting each set of the detected signals obtained from the detector array of a plurality of rotation angles to two-dimensional inverse Fourier transform to synthesize an image of the object;

wherein the grid pitch $p_k$ of the k-th objective grid in objective grid array is set as defined by the following formula wherein $\Delta$ is the basic pitch set to be approximately the same as the size of the object to be observed and N is number of the grids wherein $p_k=\Delta/k$ and $k=1, 2, \ldots, N$.

7. An imaging device comprising:

a grid system including an objective grid array with a plurality of coplanarly arranged grid couples, and a detector grid array having a similarly enlarged configuration of the objective grid array and spaced a predetermined distance apart from the objective grid array;

the coupled grids having the same slit direction and the same pitch but having phases shifted from each other by $\pi/4$, the grid couples having a plurality of intermittent slit directions and having different pitches in each of the slit directions, a detector array including a plurality of detectors each detecting energy ray transmitted through each of the grids of the detector grid array, a signal processing means to which detected signals from the detector array are inputted, and an image display means for displaying an image of the object based on the signals from the signal processing means;

said signal processing means subjecting each set of the detected signals corresponding to the coupled grids having the same slit direction and the same pitch but having phases shifted from each other by $\pi/4$ as cosine and sine components in Fourier transform to two-dimensional inverse Fourier transform to synthesize an image of the object.

8. The imaging device according to claim 7, wherein the signal processing means synthesizing image through a non-linear optimization method, which is represented by maximum entropy method, instead of the two-dimensional inverse Fourier transform.

9. The imaging device according to claim 7, wherein the magnification of the similar enlargement is 3 to 10.

10. The imaging device according to claim 7, wherein the grid pitch $p_k$ of the k-th objective grid in objective grid array is set as defined by the following formula wherein $\Delta$ is the basic pitch set to be approximately the same as the size of the object to be observed and N is number of the grids.

$$p_k = \Delta/k \; k = 1, 2, \ldots, N.$$

11. The imaging device according to claim 7, wherein the detector is an X-ray detector or gamma ray detector.

12. The imaging device according to claim 7, wherein the detector is an X-ray detector or gamma ray detector and further comprising a means for detecting only an X-ray or gamma ray within a specific energy range.

* * * * *